United States Patent
Itou

(10) Patent No.: US 7,279,696 B2
(45) Date of Patent: Oct. 9, 2007

(54) OPTICAL INFORMATION CODE READING APPARATUS USING MARKER BEAM

(75) Inventor: Kunihiko Itou, Chiryu (JP)

(73) Assignee: DENSO Wave Incorporated, Tokyo (JP)

( * ) Notice: Subject to any disclaimer, the term of this patent is extended or adjusted under 35 U.S.C. 154(b) by 0 days.

(21) Appl. No.: 11/208,591

(22) Filed: Aug. 23, 2005

(65) Prior Publication Data

US 2006/0054844 A1   Mar. 16, 2006

(30) Foreign Application Priority Data

Aug. 25, 2004  (JP)  ............................. 2004-245149

(51) Int. Cl.
*H01J 3/14* (2006.01)
*G06K 7/10* (2006.01)

(52) U.S. Cl. ...................... 250/566; 250/216; 235/454; 235/462.01

(58) Field of Classification Search ................ 250/566, 250/234.235, 216, 271, 557, 555; 235/462.34, 235/462.01, 454, 462.42, 462.32, 472.01–472.03, 235/439, 440; 359/35, 739, 738, 719; 382/181, 382/312, 313; 369/44.14, 44.22, 44.24

See application file for complete search history.

(56) References Cited

U.S. PATENT DOCUMENTS

| | | | | | |
|---|---|---|---|---|---|
| 4,603,262 | A | * | 7/1986 | Eastman et al. | ............ 250/566 |
| 4,639,070 | A | * | 1/1987 | Ikeda et al. | ............ 235/462.34 |
| 5,350,909 | A | * | 9/1994 | Powell et al. | .......... 235/462.32 |
| 5,608,529 | A | * | 3/1997 | Hori | ........................... 356/609 |
| 5,717,194 | A | * | 2/1998 | Forbes et al. | .......... 235/462.32 |
| 6,877,664 | B1 | * | 4/2005 | Oliva | .................... 235/462.42 |
| 6,885,454 | B2 | * | 4/2005 | Naya et al. | ................. 356/445 |
| 7,097,106 | B2 | * | 8/2006 | Silverbrook et al. | ... 235/462.45 |

FOREIGN PATENT DOCUMENTS

JP    9-201689    8/1997

* cited by examiner

*Primary Examiner*—Georgia Epps
*Assistant Examiner*—Pascal M. Bui-Pho
(74) *Attorney, Agent, or Firm*—Posz Law Group, PLC

(57) ABSTRACT

In an optical information reading apparatus, a marker beam irradiating unit has a light beam source for emitting a light beam, a diffusing lens for diffusing the light beam emitted from the light beam source, and a collective lens for collecting the light beam diffused by the diffusing means. The marker beam irradiating unit has a pattern forming unit for forming a marker beam based on the light beam collected by the collecting means to irradiate the marker beam. The marker beam has a predetermined beam pattern indicating the reading position of the pickup unit.

11 Claims, 7 Drawing Sheets

$$\frac{1}{a} + \frac{1}{b} = \frac{1}{f}$$

OPTICAL INFORMATION CODE READING APPARATUS USING MARKER BEAM

CROSS REFERENCE TO RELATED APPLICATION

This application is based on Japanese Patent Application 2004-245149 filed on Aug. 25, 2004. This application claims the benefit of priority from the Japanese Patent Application, the descriptions of which are all incorporated herein by reference.

BACKGROUND OF THE INVENTION

1. Field of the Invention

The present invention relates to apparatuses for optically reading a target to which optically readable information, such as an information code, for example, a barcode or a two-dimensional code, is attached.

2. Description of the Related Art

Handheld optical information readers aim at reading information codes optically readable, such as barcodes, two-dimensional codes, or other similar codes. In this specification, a target itself or a target to which optically readable information is attached is collectively referred to as the "target".

For improving the usability of handheld optical information readers, handheld optical information readers that can read an information code positioned at a distance therefrom have been provided.

The handheld optical information reader has a handheld body case provided at its one end portion with a reading window. In addition, the handheld optical information reader also has a photodetector, such as a CCD (Charge-Coupled Device) area sensor, an imaging optics with an imaging lens, and a reading unit composed of a light illuminating device, such as an LED (light emitting diode). The photodetector, the imaging unit, and the reading unit are installed in the body case, respectively.

In order to align the reading window (the photodetector) with the target, handheld optical information readers have been commonly provided with a marker beam irradiating unit using a laser diode (LD), an LED, or other similar light emitting devices. The marker beam irradiating unit is operative to irradiate a marker beam onto the target for indicating a reader's reading position, such as a field of view (FOV) of the photodetector, and/or the center position of the FOV, onto the target.

An example of such marker beam irradiating units is disclosed in Japanese non-examined Patent Publication No. H9-201689. The disclosed marker beam irradiating unit uses an LD, as a light source, capable of emitting a marker beam with high-visibility, and a slit plate for forming a predetermined shaped beam pattern on the target.

Specifically, as illustrated in FIGS. 9A, 9B, and 10, a marker beam irradiating device 1 is provided with an LD (laser diode) 2, and a slit plate 3 opposite to the laser-beam emitting plane of the LD with a predetermined interval. In addition, the marker beam irradiating device 1 is provided with an imaging lens 4 coaxially arranged with respect to the LD to be opposite to the slit plate 3 with a predetermined interval.

As illustrated in FIGS. 9B and 11, the slit plate 3 has a metal thin-plate, and a plurality of slits 3a formed therethrough. The shape of each slit 3a and arrangement of the slits 3a correspond to a desirable beam pattern of a marker beam M10. For example, the beam pattern of the marker beam M 10 consists of four L-shaped pattern elements corresponding to the four corner portions of the field of view of a CCD area sensor as a photodetector of an optical information reader. In addition, the beam pattern of the marker beam M10 consists of a cross pattern element indicating the center of the field of view.

Specifically, in the marker beam irradiating device 1, a laser beam emitted from the laser diode 2 is entered the slit plane 3, so that beamlets passing through the slits 3a of the slit plane 3 are irradiated as the marker beam M10 with the desirable beam pattern onto a target R through the imaging lens 4 (see FIG. 10).

In the structure of the marker beam irradiating device 1, as illustrated in FIG. 10, a suitable relationship between the distance "a" between the principal point of the imaging lens 4 along the optical axis direction and the distance "b" between the laser beam emitting position of the LD 2 and the principal point of the imaging lens therealong has been represented as the following formula (Lens formula):

$$1/a + 1/b = 1/f$$

where "f" represents the focal distance of the imaging lens 4.

In the structure of the marker beam irradiating device 1, however, as illustrated in FIG. 11, the laser beam emitted from the LD is diffused to have a substantially horizontally prolate ellipsoid profile L0 in its lateral cross section. This may cause loss of the amount of laser beam when it passes through the slits 3a of the slit plate 3, resulting in that the amount of brightness of the marker beam may be insufficient.

In order to prevent the loss of the amount of laser beam, it is to be considered to collect the diffused laser beam in a substantially circular form in its lateral cross section and to cause the collected laser beam to be incident into the slit plate 3.

Specifically, as illustrated in FIG. 12, a marker beam irradiating device 5 is provided with a collective lens 6 coaxially arranged between the LD 2 and the slit plate 3, in addition to the structure of the device 1 in FIG. 9A. The collective lens 6 is operative to collect the laser beam emitted from the LD 2 in a substantially circular form in its lateral cross section.

The structure of marker beam irradiating device 5, however, may cause the area of slit plate 3 to be excessively small. This may make it difficult to form the slits 3a through the thin-plate, or to pass the collected beam through the slits 3a because of the excessively thin width of each slit 3a. The later problem may cause the brightness of marker beam M10 on the target R to decrease, and a fringe pattern (diffraction fringe pattern) to appear on the target R.

For avoiding the decrease of the slit plate's area, as illustrated in FIG. 13, a marker beam irradiating device 7 is designed such that the LD 2 and the collective lens 6 are arranged to be sufficiently away from each other along the optical axis direction. This structure can ensure enough area for the slit plate 3 to allow the collected laser beam to pass through the slits 3a.

The structure of marker beam irradiating device 7, however, may cause its length along the optical axis direction to increase, in other words, its size to increase. This may deteriorate the installability of the device 7, making it difficult to install the device 7 in handheld optical information readers.

SUMMARY OF THE INVENTION

The present invention has been made on the background so that preferable embodiments of optical reading apparatuses of the present invention are capable of clearly brightly irradiating a marker beam with a predetermined beam pattern onto a target.

According to one aspect of the present invention, there is provided an optical information reading apparatus. The optical information apparatus includes a pickup unit having a predetermined reading position and configured to optically pickup information of a target when the information is located at the reading position, and a marker beam irradiating unit. The marker beam irradiating unit includes a light beam source configured to emit a light beam, and a beam pattern forming member arranged at a light beam emitting side of the light beam source. The marker beam irradiating unit includes a diffusing lens coaxially arranged between the light beam source and the beam pattern forming member and configured to diffuse the light beam emitted from the light beam source. The marker beam irradiating unit includes a collective lens coaxially arranged between the diffusing lens and the beam pattern forming member and configured to collect the diffused light beam so that the collected light beam is incident into the beam pattern forming member. The beam pattern forming member is configured to form a marker beam based on the incident collected light beam to irradiate the marker beam. The marker beam has a predetermined beam pattern indicating the reading position of the pickup unit.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

Embodiments of the present invention will be described hereinafter with reference to the accompanying drawings. In the embodiments, the invention is applied to a gun-shaped two-dimensional code reader.

First Embodiment

Figure 1:
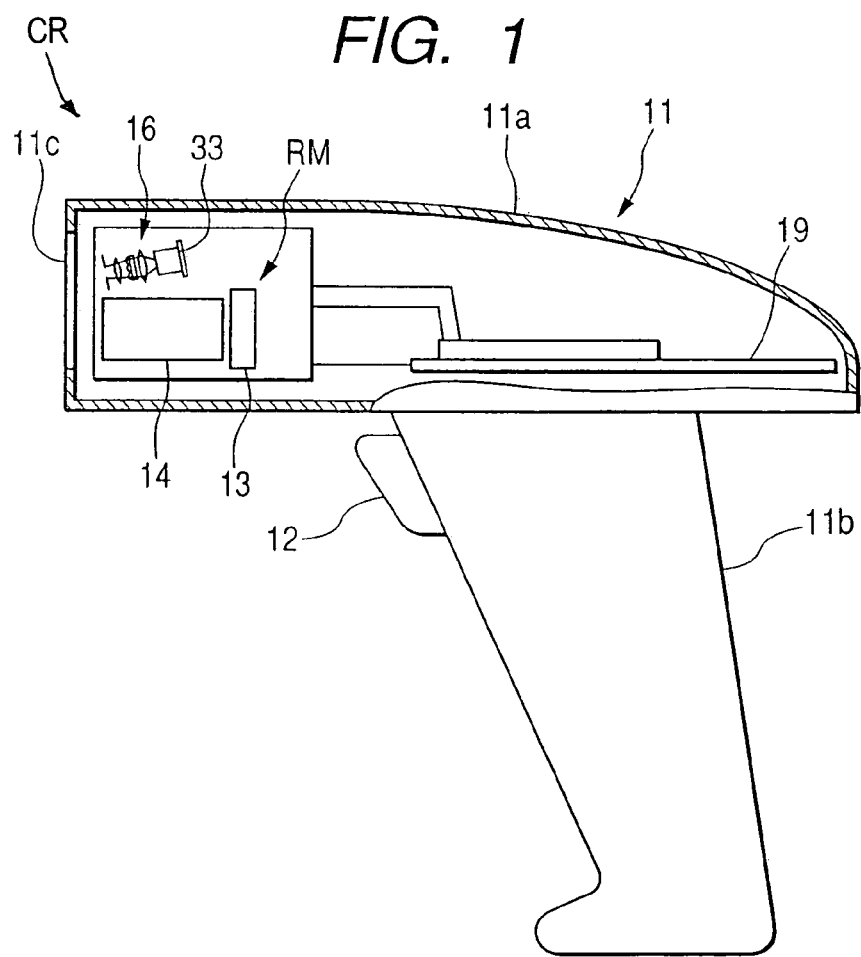
FIG. 1 is a partially cross sectional side view schematically illustrating the structure of a gun-shaped two-dimensional code reader according to a first embodiment of the present invention.
Figure 2:
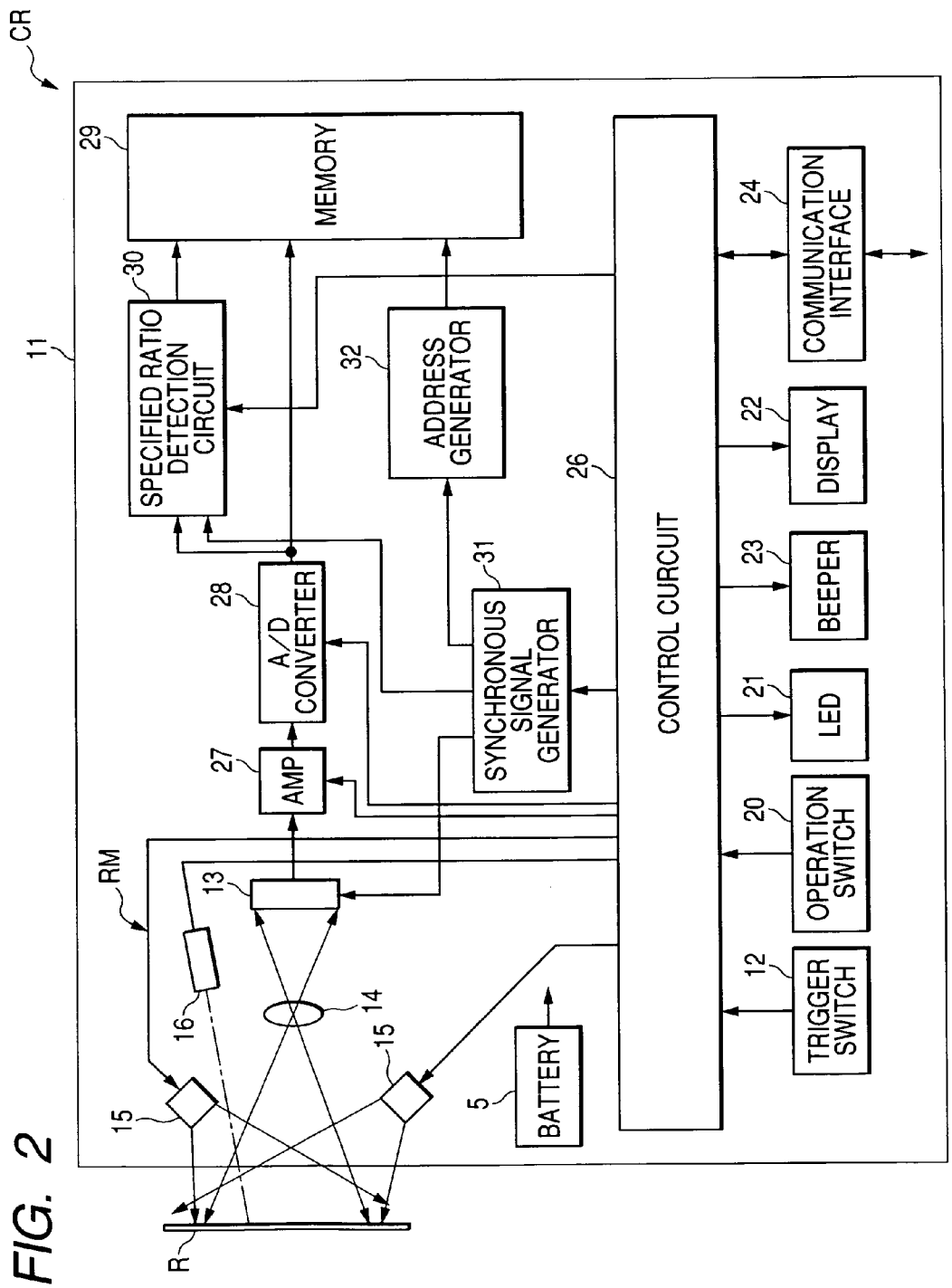
FIG. 2 is a block diagram schematically illustrating the electrical structure of the two-dimensional code reader according to the first embodiment.

FIG. 1 is a partially cross sectional side view schematically illustrating the structure of a gun-shaped two-dimensional code reader CR according to a first embodiment of the present invention; FIG. 2 is a block diagram schematically illustrating the electrical structure of the two-dimensional code reader CR according to the first embodiment.

As shown in FIG. 1, the two-dimensional code reader CR as an example of apparatuses for optically reading a target according to the first embodiment of the present invention is provided with a gun-shaped housing 11. The gun-shaped housing 11 has, for example, a thin rectangular parallelepiped main body 11a. One lateral end portion of the main body 11a is rounded.

The gun-shaped housing 11 is provided at one side (specifically, bottom side in FIG. 1) of the one lateral end portion of the main body 11a with a grip portion 11b extending away from the main body 1a. The grip portion 11b is integrally formed to the main body 11a. The grip portion 11b allows a user to easily grip the two-dimensional code reader CR in one hand and handle it.

The main body 11a is formed at a lateral surface of the other lateral end portion with a reading window 11c having, for example, a rectangular shape and translucency. The two-dimensional code reader CR is also provided with a trigger switch 12. The trigger switch 12 is disposed to one side surface of the grip portion 11b, which is directed to the reading window 11c. The trigger switch 12 permits a user to instruct a reading operation to the two-dimensional code reader CR.

The two-dimensional code reader CR is provided with a reading mechanism (optical reading mechanism) RM disposed in the other lateral end portion of the housing 11. In the first embodiment, the other lateral end portion of the housing 11 is referred to as "head portion".

The reading mechanism RM is operative to read a two-dimensional code, such as a QR (Quick Response) code, attached to a target R (see FIG. 2) by printing or other similar methods. The target R includes a catalog and a label that is a piece of paper or another media. The target R can be attached on goods, which is the same as general barcodes. The two-dimensional code includes information, such as, a manufactures serial number, a name, a unique identification number, a date of manufacture of the goods, and a URL indicating information on the Internet.

In recent years, the target R includes the screen of a display, such as a liquid crystal display (LCD) in a computer terminal, such as a cellular phone or a PDA (Personal Digital Assistant); a two-dimensional code is displayed on the screen of the display.

For example, the two-dimensional code consists of different color cells, such as black or white cells arranged in a matrix to form specific patterns therein, thereby indicating data. One of the black and white colors corresponds to one of bit values "0" and "1", and the other of the black and white colors to the other of bit values "0" and "1". After reading the cells, it is possible to digitize easily the read color data to decode it.

Figure 3:
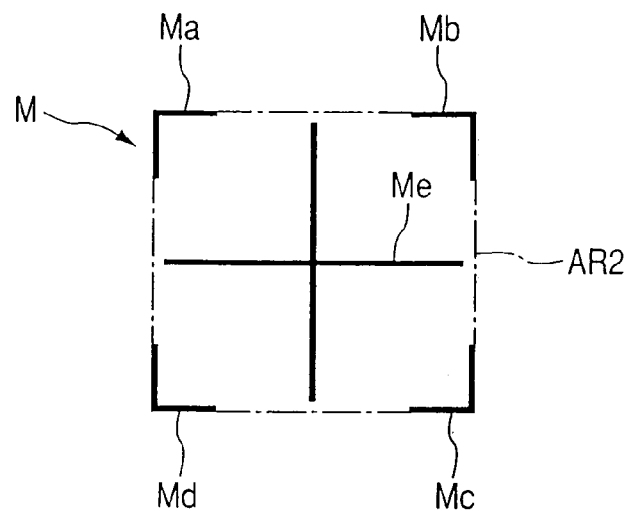
FIG. 3 is a view schematically illustrating the pattern shape of a predetermined marker beam pattern on a target, which is formed by a marker beam irradiating device shown in FIG. 2.

As schematically illustrated in FIGS. 1 to 3, the reading mechanism RM includes a photodetector 13, an imaging lens 14 constituting an imaging optics, and a plurality of, such as a pair of, light illuminating devices 15; these devices 15 are only illustrated in FIG. 2. The reading mechanism RM also includes a marker beam irradiating device 16 for marking the location of the field of view (FOV) of the photodetector 13 and/or the center of the field of view.

The photodetector 13 is composed of, for example, a CCD area sensor. The photodetector 13 is located at the center of the head portion of the main body 11a. The photodetector 13 has an active area (light sensitive pixel area) composed of pixels arranged horizontally and vertically, for example, in matrix. Specifically, in the first embodiment, the pixel area of the photodetector 13 corresponds to the FOV thereof.

The photodetector 13 also has a predetermined optical axis. The photodetector 13 is arranged so that its pixel area is parallely opposite to the reading window 11c of the main body 11a and its optical axis coaxially aligned with the center of the reading window 11c. The aspect ratio of the field of view of the photodetector 13 is set to, for example, 3:4. The exposure time, that is, the shutter speed of the photodetector 13, can be externally controlled.

The imaging lens 14 has a body tube and a plurality of lens elements that are disposed coaxially therein. The imaging lens 14 has a predetermined optical axis. The imaging lens 14 is arranged so that its optical axis extends orthogonally with the head end surface, which is formed with the reading window 11c, of the main body 11a. That is, the reading window 11c, the photodetector 13 and the imaging lens 14 are coaxially aligned with one another in the main body 11a.

Each of the light illuminating devices 15 is disposed around the imaging lens 14 except for one radial side, specifically top side, thereof. Specifically, each of the light illuminating devices 15 is provided with a light emitting diode (LED) serving as a light source. Each of the light illuminating devices 15 is also provided with a light lens disposed between the corresponding light emitting diode and the reading window 11c. An optical axis of each light lens is directed to the reading window 11c so that each light lens is operative to collect and diffuse light emitted from each light emitting diode through the reading window 11c.

Specifically, when the reading window 11c of the code reader CR is positioned to be opposite to the target R on which the two-dimensional code is attached, illuminating light emitted from each of the light illuminating devices 15 is irradiated through the reading window 11c onto the two-dimensional code. Light reflected from the two-dimensional code is entered through the reading window 11c into the imaging lens 14. The reflected light entered into the imaging lens 14 is focused on the pixel area of the photodetector 13 by the imaging lens 14, so that an image corresponding to the two-dimensional code is picked up by the photodetector 13.

In addition, as shown in FIG. 1, the two-dimensional code reader CR is provided with a circuit board 19 disposed in the main body 11a at its one end side, specifically backside opposite to the head side. In the circuit board 19, electrical components of the code reader CR are installed (see FIG. 2). As illustrated in only FIG. 2, the two-dimensional code reader CR is provided with an operation switch 20, an LED (light emitting diode) 21, a liquid crystal display 22, a beeper 23, and a communication interface 24. These elements 20 to 24 are disposed to the other side (specifically, top side in FIG. 1) of the one lateral end portion of the main body 11a, respectively.

The operation switch 20 allows a user to input various instructions to the code reader CR. The LED 21 is operative to visually indicate information to send notice to a user. The beeper 23 is operative to emit a series of beeps to send notice to a user. The communication interface 24 allows the code reader CR to communicate with external devices.

Moreover, the two-dimensional code reader CR is provided with a battery 5 as a power supply for activating the above optical devices 13, 15, 16, the electrical components installed in the circuit board 19, and the above I/O devices 12, 20-24, respectively.

As shown in FIG. 2, in the circuit board 19, a control circuit 26 composed of, for example, at least one microcomputer {a CPU (Central Processing Unit), an internal memory unit including a ROM (Read Only Memory), a RAM (Random Access Memory), and the like, and peripherals} is provided. Note that the control circuit can be designed to a hard-wired logic circuit.

The control circuit 26 operates based on power supplied from the battery 25. The control circuit 26 operates in accordance with programs stored in, for example, the ROM and/or RAM to control the whole of the two-dimensional code reader CR and to perform decoding processes and other processes. The programs can be loaded from a signal bearing media to the internal memory unit. Examples of suitable signal bearing media include recordable type media such as floppy disks and CD (Compact Disk)-ROM, and transmission type media such as digital and analog communications links.

The control circuit 26 is communicably coupled to the trigger switch 12 and the operation switch 20, so that the commands sent from the switches 12 and 20 are inputted to the control circuit 26. The control circuit 26 is communicably coupled to the photodetector 13, the light illuminating devices 15, and the marker beam irradiating device 16, respectively.

That is, the control circuit 26 operates to control the photodetector 13, the light illuminating devices 15, and the marker beam irradiating device 16 to execute reading processes of the two-dimensional code attached to the target R. The control circuit 26 is also communicably coupled to the LED 21, the beeper 23, and the liquid crystal display 22 to control them. Moreover, the control circuit 26 is communicably coupled to the communication interface 24 to communicate with external devices including, for example, a management computer, through the communication interface 24.

Specifically, the control circuit 26 is operative to control the exposure time (the shutter speed) of the photodetector 13.

Furthermore, in the circuit board 19, an amplifier (AMP) 27, an analog to digital (A/D) converter 28, a memory 29, a specified-ratio detection circuit 30, a synchronous signal generator 31, and an address generator 32 are installed so that they are communicably coupled to the control circuit 26, respectively.

The amplifier 27 is electrically connected to the photodetector 13 and operative to amplify an image signal outputted from the photodetector 13 at a gain based on a gain control signal transmitted from the control circuit 26. The A/D converter 28 is electrically connected to the amplifier 27 and operative to convert the amplified image signal into digital image data {light intensity data (pixel data) of each pixel of the light sensitive pixel area of the photodetector 13}.

The synchronous signal generator 31, for example, periodically generates a synchronous signal to periodically output it to the photodetector 13, the specified ratio detection circuit 30, and the address generator 32 under the control of the control circuit 26.

The address generator 32 periodically counts a number of the transmitted synchronous signals to generate address signals in response to the count result, thereby outputting the address signals to the memory 29.

Specifically, the image data sent from the A/D converter 28 is stored in the memory 29 so as to correspond to the outputted address signals. The specified-ratio detection circuit 30 is operative to detect specified patterns (bit patterns) in the image data in response to the synchronous signals based on the control of the control circuit 26. The control circuit 26 and the specified-ratio detection circuit 30 identify the type of the information code corresponding to the image data based on the detected specified patterns, thereby decoding the image data based on the identified result. That is, the specified patterns in the image data allow the control circuit 26 and the specified-ratio detection circuit 30 to identify the type of the image data (information code).

Next, the structure of the marker beam irradiating device 16 will be described hereinafter with reference to FIGS. 3 to 5.

The marker beam irradiating device 16 is disposed around the reading mechanism RM. For example, the marker beam irradiating device 16 is disposed to the one radial side (top side) of the imaging lens 14 so that each of the light illuminating devices 15 and the marker beam irradiating device 16 are positionally free from each other.

The marker beam irradiating device 16 is operative to irradiate a marker beam M with a predetermined beam pattern for indicating a photodetector's reading position, such as the FOV of the photodetector 13 on the target R.

FIG. 3 illustrates the pattern shape of the predetermined marker beam pattern on the target R.

As illustrated in FIG. 3, the predetermined beam pattern of the marker beam M is composed of four L-shaped pattern elements (beamlets) Ma to Md corresponding to the four corner portions of the photodetector's FOV whose aspect ratio is set to 3:4. In addition, the predetermined beam pattern of the marker beam M is also composed of a cross pattern element Me indicating the center of the FOV. Specifically, each of the L-shaped pattern elements (beamlets) Ma to Md and the cross pattern element Me has a predetermined pattern width (beam width).

Figure 4:
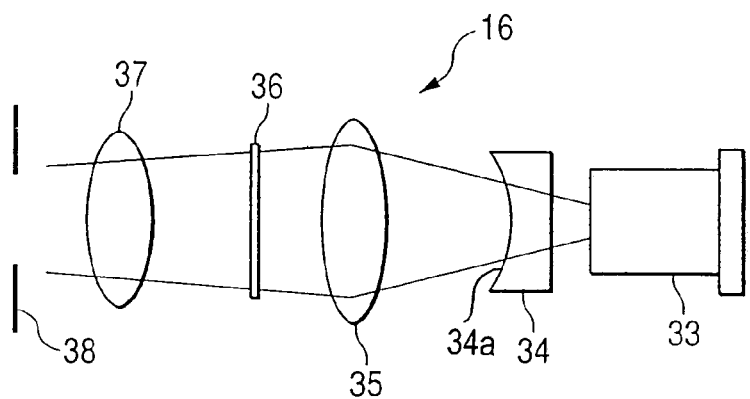
FIG. 4 is a view schematically illustrating the structure of the marker beam irradiating device according to the first embodiment of the present invention.

As illustrated in FIG. 4, the marker beam irradiating device 16 is provided with a laser diode 33 as a light source, which is directed such that the optical axis thereof passes through the reading window 11c. The marker beam irradiating device 16 is also provided with a diffusing lens 34, a collective lens 35, a slit plate 36 as an example of pattern forming members, an imaging lens 37, and a lens aperture 38. The optical elements 34 to 38 are coaxially aligned at the laser-beam output side (reading window side) of the laser diode 33 in this order with predetermined intervals.

Specifically, the laser diode 33 is operative to emit a diffused laser beam in the visible range of frequencies, such as a red laser beam toward the diffusing lens 34. The laser beam, represented as "L1" in FIG. 5, has a substantially horizontally prolate ellipsoid profile in its lateral cross section. That is, the longitudinal direction of the laser beam L1 in its lateral cross section is parallel to the horizontal direction of the FOV of the photodetector 13.

The diffusing lens 34 is operative to further diffuse the diffused laser beam L1 emitted from the laser diode 33 so that the diffused laser beam outputted from the diffusing lens 34 has a substantially circle in its lateral cross section.

Specifically, the diffusing lens 34 has an output surface 34a facing the collective lens 35; this output surface 34a is concavely curved in the vertical direction. The output surface 34a allows the diffused laser beam L1 incident into the diffusing lens 34 to be further diffused in the vertical direction so that the diffused laser beam L2 has a substantially circle with a diameter of, for example, the major axis length of the diffused laser beam L1 in its lateral cross section.

The collective lens 35 is designed to, for example, a convex lens. Specifically, the collective lens 35 is operative to collect the diffused laser beam L2 outputted from the diffusing lens 34, and to allow the collected beam to enter into the slit plate 36.

Figure 5:
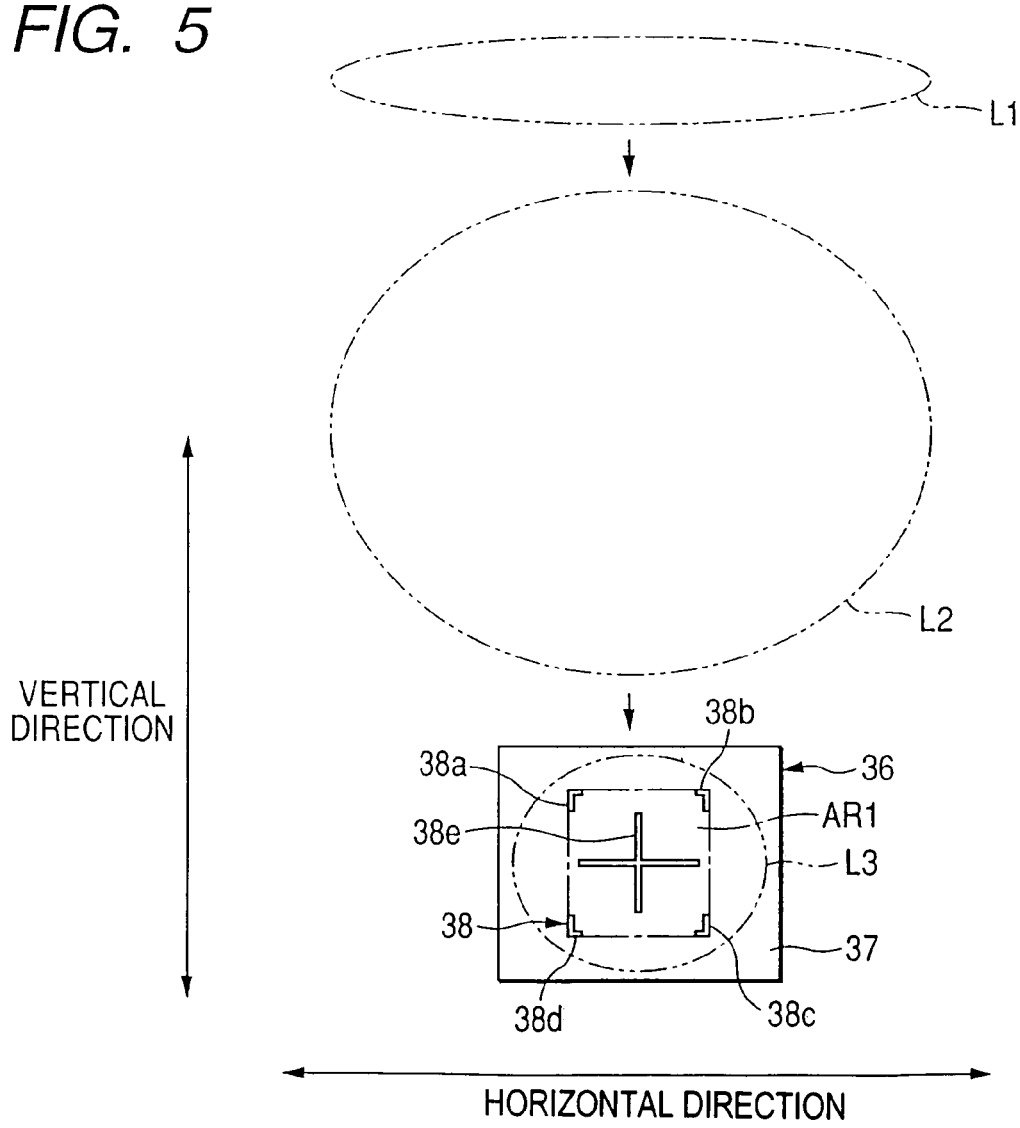
FIG. 5 is a view schematically illustrating:
a first profile of a laser beam in its lateral cross section, which is emitted from a laser diode of the marker beam irradiating device,
a second profile of a laser beam in its lateral cross section, which is diffused by a diffusing lens, and
a third profile of a laser beam in its lateral cross section, which is collected by a collective lens to be incident into a slit plate according to the first embodiment of the present invention.
Figure 6:
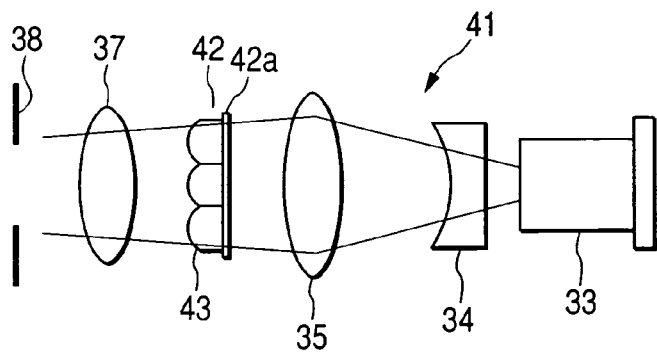
FIG. 6 is a view schematically illustrating the structure of a marker beam irradiating device according to a second embodiment of the present invention.

A laser beam collected by the collective lens 35, which is represented as "L3" in FIG. 5 and is incident into the slit plate 36, has the substantially circular beam profile in its lateral cross section. The collective lens 35 is designed such that the ratio of a length in the vertical direction passing through the center of the beam L3 to that in the horizontal direction passing through the center thereof is set to a ratio substantially equal to the aspect ratio of the photodetector's FOV of 3:4.

As illustrated in FIG. 5, the slit plate 36 has a metal thin-plate 37 with a horizontally long plate-like shape; this shape corresponds to the area of the photodetector's FOV so that the plate 37 has a ratio of its longitudinal side to its lateral side, which is substantially equal to the aspect ratio of the photodetector's FOV of 3:4. The plate 37 is coaxially aligned with the collective lens 35.

The slit plate 36 also has a plurality of slits 38a to 38e formed through the plate 37. The shape of each of the slits 38a to 38e and arrangement of the slits 38a to 38e correspond to the beam pattern of the marker beam M (see FIG. 5).

As illustrated in FIG. 5, the number of slits 38a to 38e corresponds to that of the beam pattern elements Ma to Me, and the shape and orientation of each of the slits 38a to 38e corresponds to those of each of the beam pattern elements Ma to Me.

Specifically, each of the slits 38a to 38d has a substantially L-shape, and the slits 38a to 38d are arranged to corner portions of a predetermined first rectangular area AR1 of the plate 37; this first rectangular area AR1 corresponds to a second rectangular area AR2 corresponding to the FOV formed by the L-shaped beam pattern elements Ma to Md. The slit 38e has a substantially cross-shape, and is arranged at the center of the first rectangular area, which corresponds to the beam pattern element Me. In addition, the width of each of the slits 38a to 38e corresponds to that of each of the beam pattern elements Ma to Me.

When the laser beam is entered into the slit plate 37, beamlets passing through the slits 38a to 38e of the slit plate 36 are entered into the imaging lens 37 as the marker beam M with the beam pattern shown in FIG. 3.

The imaging lens 37 is operative to form an image on the target R based on the marker beam M through the lens aperture 38. The lens aperture 38 is operative to eliminate diffusive light when the target R is comparatively far from the reading window 11c.

In the first embodiment, the control circuit 26 is operative to control the laser diode 33 of the marker beam irradiating device 16 such that the laser diode 33 continuously or periodically emits the laser beam while the two-dimensional code reader CR is running.

In addition, it is assumed that the trigger switch 12 is designed to allow a user to push it in two strokes (first and second strokes). In this assumption, in order to irradiate the marker beam M on the target R, a user pushes the trigger switch in the first stroke, such as in half stroke. The command corresponding to the half stroke of the trigger switch 12 and representing to irradiate the marker beam M is sent to the control circuit 26, so that the control circuit 26 is operative to control the laser diode 33 to emit the laser beam.

Next, operations of the two-dimensional code reader CR according to the first embodiment will be described hereinafter.

When a user wants to read the two-dimensional code attached to the target R, the user locates the power-on state code reader CR so that the reading window 11c is opposite to the target R and away therefrom at an arbitrary distance.

While the code reader CR is arranged in such a state, because the laser beam is continuously emitted from the laser diode 33 of the marker beam irradiating device 16, so that the marker beam M is continuously irradiated on the target R from the marker beam irradiating device 16 (see FIG. 3). The marker beam M indicates the reading position (FOV) of the photodetector 13.

Next, the user aligns the code reader CR with the target R to locate it to a position where the two-dimensional code is located at the center of the irradiated marker beam M (FOV). While the marker beam M is being irradiated on the target R, the user operates the trigger switch 12 to turn it on.

In response to the turning on of the trigger switch 12, the control circuit 26 controls the laser diode 33 to temporarily interrupt the irradiation of the marker beam M, and turns on each of the light illuminating devices 15.

As a result, illuminating light emitted from each of the light illuminating devices 15 is irradiated through the reading window 11c onto the two-dimensional code on the target R. Light reflected from the two-dimensional code of the target R is entered through the reading window 11c into the imaging lens 14. The reflected light entered into the imaging lens 14 is focused on the pixel area of the photodetector 13 by the imaging lens 14, so that an image corresponding to the two-dimensional code is picked up by the photodetector 13.

While the marker beam M transferred from the marker beam irradiating device 16 is irradiated on the target R, as illustrated in FIG. 5, the laser beam L1 emitted from the laser diode 33 is diffused to have the substantially horizontal prolate ellipsoid profile in its lateral cross section (see FIG. 5), thereby being entered into the diffused lens 34. The diffused laser beam L1 is, however, entered into the diffused lens 34 so that the diffused laser beam L1 is further diffused in the vertical direction to have the substantially circular profile in its lateral cross section. The diffused laser beam L2 having the substantially circular profile in its lateral cross section is collected by the collective lens 35.

Thereafter, the laser beam L3 collected by the collective lens 35 is incident into the slit plate 36 with its beam profile being kept in a circle in its lateral cross section; this circular shaped profile of the beam L3 incident into the slit plate 36 corresponds to the first predetermined area AR1. Specifically, as illustrated in FIG. 5, the laser beam L3 incident into the slit plate 36 is more collected as compared with a case where the laser beam is directly incident into the slit plate 36. This allows the efficiency of collecting the laser beam emitted from the laser diode 33 to increase, making it possible to keep loss of the amount of laser beam incident into the slit plate 36 at a low level.

Particularly, in the first embodiment, the ratio of the length in the vertical direction passing through the center of the laser beam L3 incident into the slit plate 36 to that in the horizontal direction passing through the center thereof is set to the ratio substantially equal to the aspect ratio of the photodetector's FOV of 3:4. This allows the loss of the amount of laser beam L3 incident into the slit plate 36 to further decrease, making it possible to increase the efficiency of entering the laser beam L3 into the slit plate 36.

Furthermore, in the first embodiment, the laser beam L1 emitted from the laser diode 33 is at first diffused in the vertical direction and, after that, the diffused laser beam L2 is collected by the collective lens 35 to be entered into the slit plate 36. This allows the collected laser beam L3 focused on the slit plate 36 to be sufficiently kept large in correspondence with the first predetermined area AR1 on the slit plate 36 corresponding to the FOV. Specifically, in the first embodiment, unlike in the case of providing only a collective lens, it is possible to increase the efficiency of collecting the laser beam L3 into the slit plate 36 without making the slit plate 36 (the slits 38a to 38e) excessively small. This also allows the slits 38a to 38e through the thin-plate 37 to be easily formed.

Still furthermore, in the first embodiment, it is possible to increase the efficiency of collecting the laser beam L3 into the slit plate 36 without maintaining a long distance between the laser diode 33 and the collective lens 35. In other words, the structure of the marker beam irradiating device 16 can increase the efficiency of collecting the laser beam L3 into the slit plate 36 without upsizing the marker beam irradiating device 16 and/or the housing 11. Free form of the slits through the thin-plate 37 permits desirable designs of beam patterns of the marker beam M.

In the first embodiment, adoption of the laser diode 33 as a light beam source allows the marker beam with high visibility to be irradiated on the target R. Moreover, in the first embodiment, even if the target R is comparatively far from the reading window 11c, the lens aperture 37 eliminates diffusive light, making it possible to improve the clearness of the beam pattern of the marker beam M irradiated on the target R.

As set forth above, in the first embodiment of the present invention, the marker beam irradiating device 16 is provided with the diffusing lens 34 and the collective lens 35 between the laser diode 33 as a light beam source and the slit plate 36 as a pattern forming member. This structure allows the laser beam emitted from the laser diode 33 to be firstly diffused, and, after that, to be collected to be incident into the slit plate 36. This makes it possible to clearly brightly irradiate the marker beam M with the predetermined beam pattern on the target R, unlike in the case of directly entering a laser beam emitted from a laser diode into a slit plate, which has been described in the Related Art (see FIG. 8A).

In addition, unlike in the case of providing only a collective lens, it is possible to increase the efficiency of collecting the laser beam L3 into the slit plate 36 with the size of the slit plate 36 (the widths of the slits 38a to 38e) sufficiently kept. Moreover, it is possible to increase the efficiency of collecting the laser beam L3 into the slit plate 36 without maintaining a long distance between the laser diode 33 and the collective lens 35, preventing the marker beam irradiating device 16 and/or the housing 11 from upsizing.

Second Embodiment

FIGS. 6, and 7A to 7C illustrate a second embodiment of the present invention. Explanations of the elements of a second embodiment's two-dimensional code reader, except for a marker beam irradiating device according to the second embodiment, which are substantially identical with those of the code reader CR according to the first embodiment, are omitted or simplified. That is, explanations are focused on the structure of the marker beam irradiating device according to the second embodiment.

In the second embodiment, a different point of the marker beam irradiating device 41 from the marker beam irradiating device 16 according to the first embodiment is that, as a pattern forming member, a pattern forming lens 42 is provided in place of the slit plate 36. Note that, in the second embodiment, the beam pattern of the marker beam M is composed of the four L-shaped pattern elements (beamlets) Ma to Md corresponding to the four corner portions of the photodetector's FOV, and the cross pattern element Me indicating the center of the FOV (see FIG. 3).

Specifically, the pattern forming lens 42 is made of, for example, transparent plastic, transparent glass, or other transparent material, and operative to form the predetermined pattern of the marker beam M.

Figure 7A:
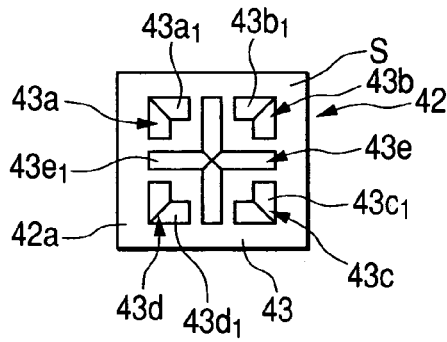
FIG. 7A is a plan view schematically illustrating the structure of a pattern forming lens of the marker beam irradiating device shown in FIG. 6.

Specifically, as illustrated in FIG. 7A, the pattern forming lens 42 is composed of a base element 42a with a horizontally long plate-like shape; this shape corresponds to the area of the photodetector's FOV. The base element 42a is coaxially aligned with the collective lens 35. The pattern forming lens 42 is also provided with a cylindrical lens assembly 43 composed of a plurality of cylindrical lens elements 43a to 43e. The cylindrical lens assembly 43 is integrated with one surface S of the base element 42a; this one surface S faces the imaging lens 37.

Figure 7B:
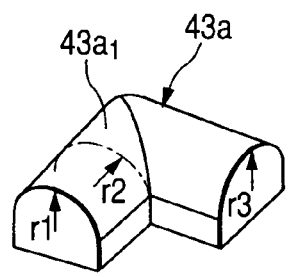
FIG. 7B is a perspective view schematically illustrating part of the pattern forming lens shown in FIG. 7A.
Figure 7C:
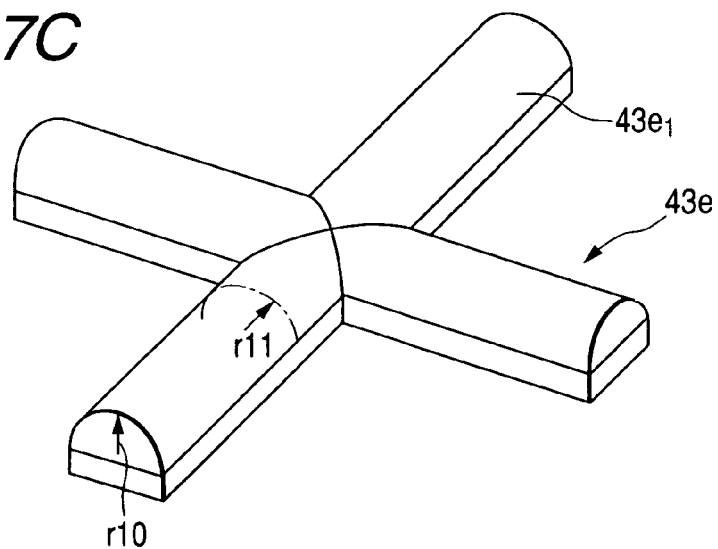
FIG. 7C is a perspective view schematically illustrating part of the pattern forming lens shown in FIG. 7A.

As illustrated in FIGS. 7A to 7C, the number of cylindrical lens elements 43a to 43e corresponds to that of the beam pattern elements Ma to Me, and the shape and orientation of each of the cylindrical lens elements 43a to 43e corresponds to those of each of the beam pattern elements Ma to Me. In addition, the cylindrical lens elements 43a to 43e are arranged on the surface S of the base element 42a to correspond to the arrangement of the beam pattern elements Ma to Me.

Specifically, each of the cylindrical lens elements 43a to 43d has a substantially L-shape. The cylindrical lens element 43a has a substantially cylindrical (semicircle) refractive surface 43a1 with a substantially continuous L-shape, when viewing it from the imaging lens side. Similarly, the cylindrical lens elements 43b to 43d have substantially cylindrical refractive surfaces 43b1 to 43d1 with substantially continuous L-shapes, when viewing them from the imaging lens side, respectively.

As illustrated in FIG. 7C, the cylindrical lens element 43e has a substantially cross-shape. Specifically, the cylindrical lens element 43e has a substantially cylindrical (semicircle) refractive surface 43e1 with a substantially continuous cross-shape, when viewing it from the imaging lens side.

That is, a cylindrical refractive surface of a cylindrical lens has a common function of, when a laser beam is incident into the cylindrical lens, causing the incident laser beam to be refracted, thereby linearly focusing the incident laser beam.

When the laser beam is entered into the L-shaped cylindrical lens elements 43a to 43d of the cylindrical lens assembly 43, therefore, the beamlet incident into the L-shaped cylindrical lens element 43a is refracted by the refractive surface 43a1 thereof. The refracted beamlet having a shape and beam width corresponding to those of the L-shaped pattern element Ma is transferred to be incident into the imaging lens 37.

Similarly, the beamlets incident into the L-shaped cylindrical lens elements 43b to 43d are refracted by the refractive surfaces 43b1 to 43d1 thereof so that the refracted beamlets each having a shape and beam width corresponding to those of each of the L-shaped pattern elements Mb to Md are transferred to be incident into the imaging lens 37.

In addition, when the laser beam is entered into the cross-shaped cylindrical lens element 43e of the cylindrical lens assembly 43, the beamlet incident into the cross-shaped cylindrical lens element 43e is refracted by the refractive surface 43e thereof. The refracted beamlet having a shape and beam width corresponding to those of the cross pattern element Me is transferred to be incident into the imaging lens 37.

In the structure of the first embodiment, as illustrated in the L-shaped cylindrical lens element 43a as a representation of the L-shaped cylindrical lens elements 43a to 43d in FIG. 7B, the cylindrical lens element 43a is configured such that the radius of curvature at each position on the refractive surface 43a1 thereof is changed depending on the distance between each position on the refractive surface 43a1 and the laser beam emitting position of the laser diode 33.

For example, reference character "r" is referred to the radius of curvature of the refractive surface 43a1 of the L-shaped cylindrical lens element 43a. When the radius "r" of curvature at the periphery of one end of the L-shaped refractive surface 43a1 is set to "r1", the farer a position on the refractive surface 43a1 is from the one end toward the corner portion of the L-shaped cylindrical lens element 43, the longer the radius (r2) of curvature at the position on the refractive surface 43a1 is.

Similarly, when the radius "r" of curvature at the peripheral of the other end of the L-shaped refractive surface 43a1 is set to "r3", the farer a position on the refractive surface 43a1 is from the other end toward the corner portion of the L-shaped cylindrical lens element 43a, the longer the radius r2 of curvature at the position on the refractive surface 43a1 is.

That is, in the second embodiment, the longer the radius of curvature at a position on the refractive surface 43a1 is, the smaller the refraction angle of the position on the refractive surface 43a1 is. Adjustment of the radius of curvature at each position on the refractive surface 43a1 therefore allows the refraction angle thereat to be controlled, making it possible to keep constant the beam width of the L-shaped beamlet transferred through the L-shaped cylindrical lens element 43a.

The radius of curvature at each position on each of the refractive surfaces 43b1 to 43d1 of each of the L-shaped cylindrical lens elements 43b to 43d has been adjusted in the same manner as the L-shaped cylindrical lens element 43a. This makes it possible to keep constant the beam width of the L-shaped beamlet transferred through each of the L-shaped cylindrical lens elements 43b to 43d.

Similarly, reference character "ra" is referred to the radius of curvature of the refractive surface 43e1 of the cross-shaped cylindrical lens element 43e. When the radius "ra" of curvature at the periphery of one end of the refractive surface 43e1 is set to "r10", the farer a position on the refractive surface 43e1 is from the one end toward the corner portion of the center portion of the lens element 43e, the longer the radius, referred to as "r11", of curvature at the position on the refractive surface 43e1 is.

That is, in the second embodiment, the longer the radius of curvature at a position on the refractive surface 43e1 is, the smaller the refraction angle of the position on the refractive surface 43e1 is. Adjustment of the radius of curvature at each position on the refractive surface 43e1 therefore allows the refraction angle thereat to be controlled, making it possible to keep constant the beam width of the cross-shaped beamlet transferred through the cross-shaped cylindrical lens element 43e.

As set forth above, in the second embodiment of the present invention, like the first embodiment, it is possible to:

clearly brightly irradiate the marker beam M with the predetermined beam pattern on the target R, increase the efficiency of collecting the laser beam L3 into the cylindrical lens assembly 43 with the size of the lens assembly 43 (the widths of the lens elements 43a to 43e) sufficiently kept, and increase the efficiency of collecting the laser beam L3 into the cylindrical lens assembly 43 without maintaining a long distance between the laser diode 33 and the collective lens 35, preventing the marker beam irradiating device 16 and/or the housing 11 from upsizing.

Besides the effects, in the second embodiment, free form of each of the lens elements and free arrangement of the lens elements on the one surface S of the base element 42a permits desirable designs of beam patterns of the marker beam M.

In each of the first and second embodiments and their modifications, as a pattern forming member, the slit plate 36 or the pattern forming lens 42 are adopted. The present invention, however, is not limited to the structure.

In the present invention, as a pattern forming lens, a diffraction grating with a hologram plane can be adopted. The hologram plane of the diffraction grating is formed with a predetermined diffraction pattern corresponding to the predetermined beam pattern shown in FIG. 3.

Figure 8:
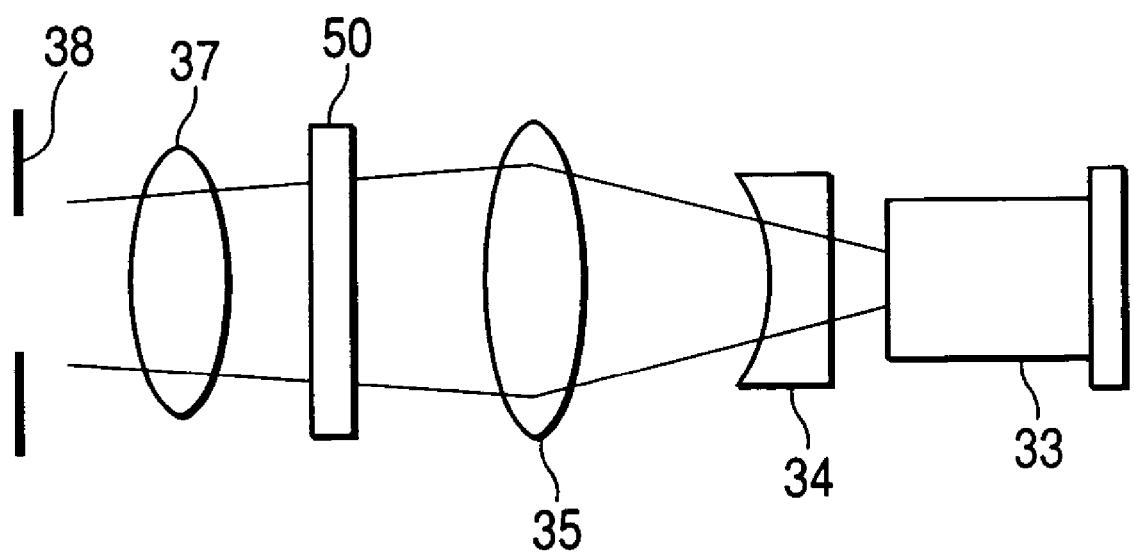
FIG. 8 is a view schematically illustrating the structure of a marker beam irradiating device according to a modification of the present invention.
Figure 9A:
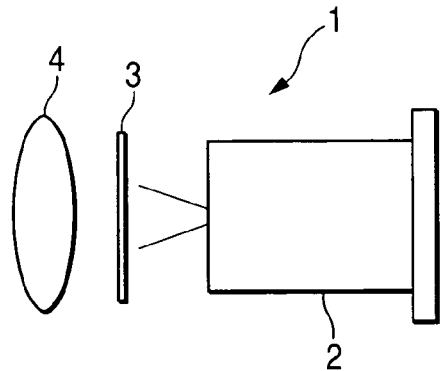
FIG. 9A is a view schematically illustrating a structure and an arrangement of a conventional marker beam irradiating device.
Figure 9B:
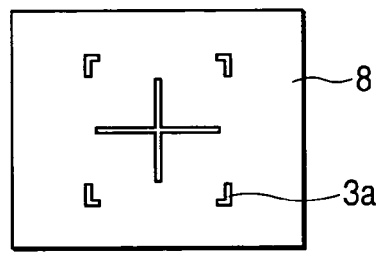
FIG. 9B is a view schematically illustrating a structure and an arrangement of slits of a slit plate shown in FIG. 9A.
Figure 10:
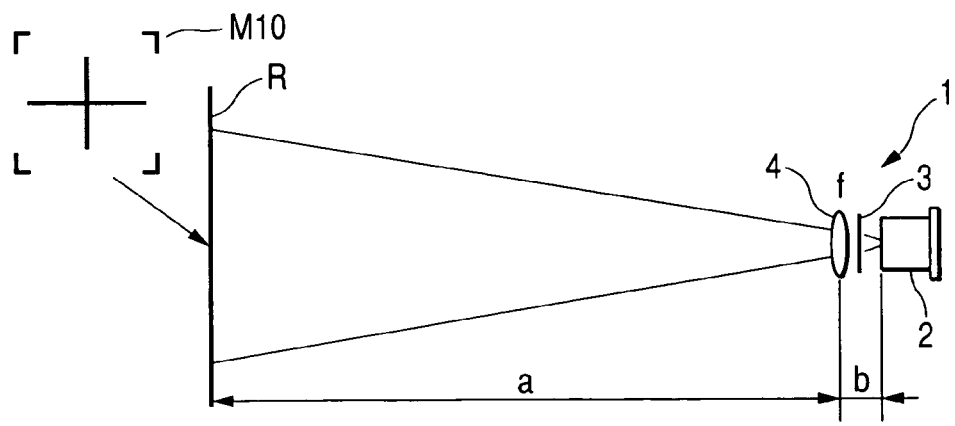
FIG. 10 is a view schematically illustrating a relationship between a target and the marker beam irradiating device shown in FIG. 9A.
Figure 11:
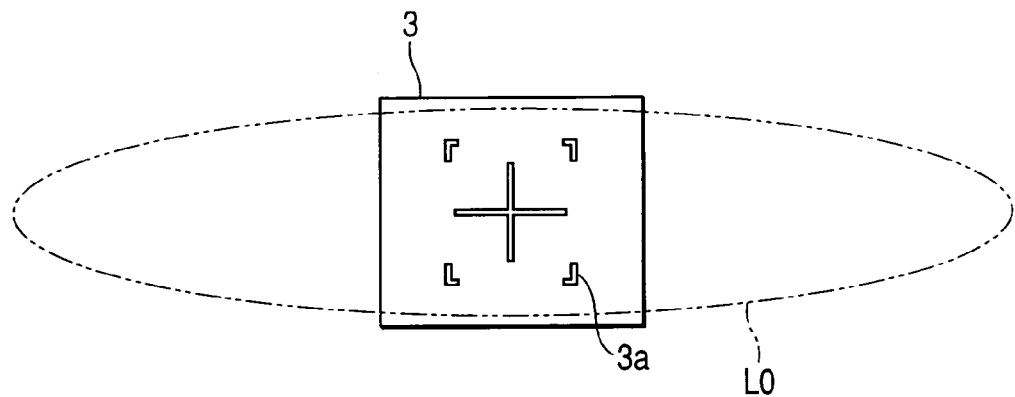
FIG. 11 is a view schematically illustrating a relationship between the slit plate and a beam profile of a laser beam emitted from a laser diode of the marker beam irradiating device shown in FIG. 9A.
Figure 12:
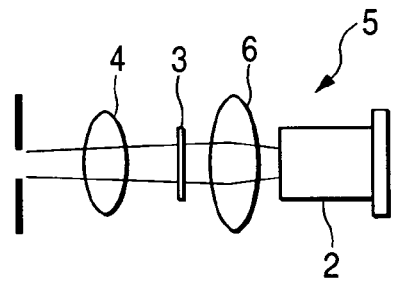
FIG. 12 is a view schematically illustrating the structure and arrangement of a modification of the conventional marker beam irradiating device shown in FIG. 9A.
Figure 13:
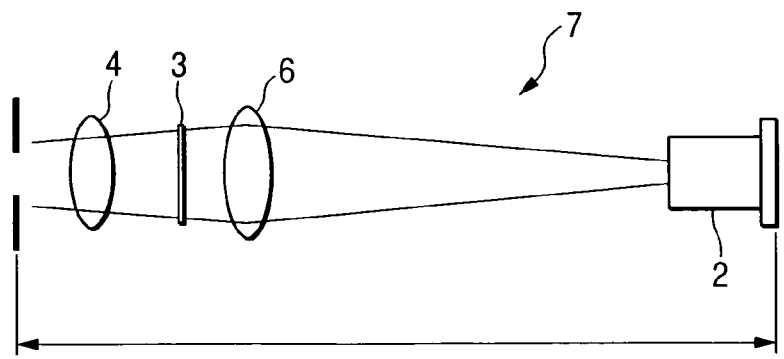
FIG. 13 is a view schematically illustrating the structure and arrangement of another modification of the conventional marker beam irradiating device shown in FIG. 9A.

Specifically, as illustrated in FIG. 8, when the laser beam collected by the collective lens 35 is incident into the hologram plane of the diffraction grating 50, the laser beam is diffracted by the diffraction pattern of the hologram plane. As a result, the first-order diffraction beamlets and the second-order diffraction beamlets are irradiated from the hologram plane as the marker beam M with the beam pattern shown in FIG. 3, onto the target R.

In this modification, it is possible to obtain the same effects as the first and second embodiments.

In each of the first and second embodiments and their modifications, the present invention is applied to a gun-shaped two-dimensional code reader, but the present invention is not limited to the structure of each of the first and second embodiments and their modifications. That is, an optical information reader according to the present invention may have another structure, such as a handheld structure.

The beam patterns of the marker beam can be widely changed. For example, a rectangular or square frame-shape corresponding to the FOV of the photodetector 13 can be used as the beam pattern of the marker beam. In addition, a plurality of cross shaped pattern elements, which indicate the center, and one and the other lateral (or longitudinal) end portions of the FOV, respectively, can be used as the beam pattern of the marker beam. In addition, the lens aperture can be provided in the marker beam irradiating devices according to the first and second embodiments and their modifications if needed, so that the lens aperture can be omitted if the devices do not need it.

Note that, the first and second embodiments and their modifications, the term of "lens and/or lens element(s)" conceptually includes any optical members made of translucent material(s) and designed to optically act on light incident thereto.

While there has been described what is at present considered to be these embodiments and modifications of the present invention, it will be understood that various modifications which are not described yet may be made therein, and it is intended to cover in the appended claims all such modifications as fall within the true spirit and scope of the invention.

What is claimed is:

1. An optical information reading apparatus comprising:
   a pickup unit having a predetermined reading field and configured to optically pickup an information code from a target when the information code is located in the reading field; and
   a marker beam irradiating unit comprising:
      a light beam source configured to emit a light beam;
      a diffusing lens coaxially arranged at a light beam emitting side of the light beam source and configured to diffuse the light beam emitted from the light beam source;
      a collective lens arranged optically coaxial with the diffusing lens and configured to collect the diffused light beam;
      a beam pattern forming member arranged between the collective lens and the target and configured to form a marker beam having a predetermined beam pattern based on the diffused light beam collected by the collective lens, the predetermined beam pattern having at least one linear beamlet indicating the reading field of the pickup unit; and
      an imaging lens arranged be the beam pattern forming member and the target and configured to form a marker beam image on the target based on the marker beam with the predetermined beam pattern;
   wherein the light beam emitted from the light beam source has a substantially prolate ellipsoid profile in a first direction orthogonal to an optical axis of the light beam source, and the diffusing lens has an output surface facing the collective lens, the output surface being concavely curved in a second direction orthogonal to the optical axis and the first direction, the output surface allowing the light beam emitted from the light beam source incident into the diffusing lens to be diffused in the second direction to form a diffused light beam so that the diffused light beam diffused by the diffusing lens has a substantially circular profile in a lateral cross section thereof.

2. An optical information reading apparatus according to claim 1, wherein the reading field is a predetermined area corresponding to a field of view of the pickup unit, and the collective lens is configured to collect the diffused light beam diffused by the diffusing lens so that the collected light beam is incident into the pattern forming member with a beam profile of the collected light beam being kept in a circle in the lateral cross section, the circular beam profile of the collected light beam incident into the pattern forming member corresponding to the predetermined area.

3. An optical information reading apparatus according to claim 1, wherein the pattern forming member includes a slit plate through which at least one slit is formed, the slit plate being arranged to allow the collected light beam to be incident into the at least one slit, a shape of the at least one slit corresponding to the predetermined beam pattern, the at least one slit being arranged in the slit plate so as to correspond to an arrangement of the beam pattern.

4. An optical information reading apparatus according to claim 1, wherein the pattern forming member includes a beam pattern forming lens with at least one lens element, the beam pattern forming lens being arranged to allow the collected light beam to be incident into the at least one lens element, the at least one lens element having a substantially cylindrical refractive surface and arranged to correspond to the beam pattern.

5. An optical information reading apparatus according to claim 4, wherein a radius of curvature at each position on the refractive surface of the at least one lens element being changed depending on a distance between each position on the refractive surface and a position of the light beam source from which the light beam is emitted.

6. An optical information reading apparatus according to claim 1, wherein the pattern forming member includes a diffraction grating with a hologram plane, the hologram plane being formed with a diffraction pattern corresponding to the predetermined beam pattern, the diffraction grating being arranged to allow the collected light beam to be incident into the grating pattern of the hologram plane thereof.

7. An optical information reading apparatus according to claim 1, wherein the pickup unit comprises an area sensor with a predetermined aspect ratio, and a ratio of length of the circular beam profile of the diffused light beam diffused by the diffusing lens in the first direction to length of the circular profile of the diffused light beam in the second direction is substantially equal to the aspect ratio, the first and second directions corresponding to horizontal and vertical directions of the area sensors respectively.

8. An optical information reading apparatus according to claim 1, wherein the light beam source includes a laser diode configured to emit a laser beam as the light beam.

9. An optical information reading apparatus according to claim 1, wherein the pattern forming member includes a slit plate through which at least one slit is formed, the slit plate being arranged to allow the collected light beam to be incident into the at least one slit, a shape of the at least one slit corresponding to the predetermined beam pattern, the at least one slit being arranged in the slit plate so as to correspond to an arrangement of the beam pattern.

10. An optical information reading apparatus according to claim 1, wherein the pattern forming member includes a beam pattern forming lens with at least one lens element, the beam pattern forming lens being arranged to allow the collected light beam to be incident into the at least one lens element, the at least one lens element having a substantially cylindrical refractive surface and arranged to correspond to the beam pattern.

11. An optical information reading apparatus according to claim 1, wherein the pattern forming member includes a diffraction grating with a hologram plane, the hologram plane being formed with a diffraction pattern corresponding to the predetermined beam pattern, the diffraction grating being arranged to allow the collected light beam to be incident into the grating pattern of the hologram plane thereof.

* * * * *

UNITED STATES PATENT AND TRADEMARK OFFICE
CERTIFICATE OF CORRECTION

| | | |
|---|---|---|
| PATENT NO. | : 7,279,696 B2 | |
| APPLICATION NO. | : 11/208591 | |
| DATED | : October 9, 2007 | |
| INVENTOR(S) | : Itou | |

It is certified that error appears in the above-identified patent and that said Letters Patent is hereby corrected as shown below:

Column 14, line 40, cancel the text beginning with "1. An optical information reading apparatus" to and including "later cross section thereof." in column 15, line 10, and insert the following claim:

1. An optical information reading apparatus comprising:
a pickup unit having a predetermined reading field and configured to optically pickup an information code from a target when the information code is located in the reading field; and
a marker beam irradiating unit comprising:
a light beam source configured to emit a light beam;
a diffusing lens coaxially arranged at a light beam emitting side of the light beam source and configured to diffuse the light beam emitted from the light beam source;
a collective lens arranged optically coaxial with the diffusing lens and configured to collect the diffused light beam;
a beam pattern forming member arranged between the collective lens and the target and configured to form a marker beam having a predetermined beam pattern based on the diffused light beam collected by the collective lens, the predetermined beam pattern having at least one linear beamlet indicating the reading field of the pickup unit; and
an imaging lens arranged between the beam pattern forming member and the target and configured to form a marker beam image on the target based on the marker beam with the predetermined beam pattern;

UNITED STATES PATENT AND TRADEMARK OFFICE
CERTIFICATE OF CORRECTION

PATENT NO.        : 7,279,696 B2
APPLICATION NO.   : 11/208591
DATED             : October 9, 2007
INVENTOR(S)       : Itou It is certified that error appears in the above-identified patent and that said Letters Patent is hereby corrected as shown below:

wherein the light beam emitted from the light beam source has a substantially prolate ellipsoid profile in a first direction orthogonal to an optical axis of the light beam source, and the diffusing lens has an output surface facing the collective lens, the output surface being concavely curved in a second direction orthogonal to the optical axis and the first direction, the output surface allowing the light beam emitted from the light beam source incident into the diffusing lens to be diffused in the second direction to form the diffused light beam so that the diffused light beam diffused by the diffusing lens has a substantially circular profile in a lateral cross section thereof.

Signed and Sealed this

First Day of April, 2008

JON W. DUDAS
*Director of the United States Patent and Trademark Office*